US008769579B2

(12) United States Patent
Kendall et al.

(10) Patent No.: US 8,769,579 B2
(45) Date of Patent: Jul. 1, 2014

(54) METHODS AND APPARATUS FOR PROVIDING A CHANNEL HISTORY

(75) Inventors: Scott Allan Kendall, Lexington, KY (US); Anthony Edward Stuart, Zionsville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1017 days.

(21) Appl. No.: 11/990,359

(22) PCT Filed: Aug. 9, 2006

(86) PCT No.: PCT/US2006/031294
§ 371 (c)(1),
(2), (4) Date: Feb. 11, 2008

(87) PCT Pub. No.: WO2007/024502
PCT Pub. Date: Mar. 1, 2007

(65) Prior Publication Data
US 2009/0037957 A1 Feb. 5, 2009

Related U.S. Application Data (60) Provisional application No. 60/710,888, filed on Aug. 24, 2005, provisional application No. 60/712,463, filed on Aug. 30, 2005.

(51) Int. Cl.
| | |
|---|---|
| *H04N 5/445* | (2011.01) |
| *H04N 7/173* | (2011.01) |
| *G06F 3/00* | (2006.01) |
| *G06F 13/00* | (2006.01) |
| *H04N 21/434* | (2011.01) |
| *H04H 60/43* | (2008.01) |
| *H04H 20/26* | (2008.01) |
| *H04N 21/442* | (2011.01) |
| *H04N 5/50* | (2006.01) |
| *H04N 21/438* | (2011.01) |
| *H04H 40/18* | (2008.01) |

(52) U.S. Cl.
CPC ............ *H04H 60/43* (2013.01); *H04N 21/434* (2013.01); *H04H 2201/60* (2013.01); *H04N 21/4345* (2013.01); *H04H 20/26* (2013.01); *H04N 21/44222* (2013.01); *H04N 5/50* (2013.01); *H04N 21/4383* (2013.01); *H04H 40/18* (2013.01)

USPC .............................. 725/46; 725/100; 725/131

(58) Field of Classification Search
USPC .......................................................... 725/46
See application file for complete search history.

(56) References Cited

U.S. PATENT DOCUMENTS 5,867,227 A * 2/1999 Yamaguchi .................... 725/56
6,438,752 B1 8/2002 McClard
(Continued)

FOREIGN PATENT DOCUMENTS

| EP | 1443752 | 8/2004 |
|---|---|---|
| EP | 1531622 | 5/2005 |

(Continued)

OTHER PUBLICATIONS

Search Report dated Feb. 20, 2007.
(Continued)

*Primary Examiner* — Ricky Chin
(74) *Attorney, Agent, or Firm* — Robert D. Shedd; Reitseng Lin (57) ABSTRACT

An apparatus such as a mobile television signal receiver includes a channel history feature. Methods for adding channels to the channel history, tuning channels from the channel history, and generally maintaining the channel history are provided. According to an exemplary embodiment, a method for adding a channel to channel history includes a step of adding a selected channel to the channel history if the channel meets a criterion. According to an exemplary embodiment, a method for tuning channels includes steps of receiving a useable program signal from a first channel, testing for presence of a useable program from a second channel without interrupting the receiving step, and if the useable program signal from the second channel is detected, tuning the second channel. According to an exemplary embodiment, a method for maintaining a channel history includes a step of maintaining a retrieved channel in the channel history if the useable program signal is present, and updating the channel history by replacing the retrieved channel with another channel if the useable program signal is not present.

19 Claims, 6 Drawing Sheets

(56) References Cited

U.S. PATENT DOCUMENTS

| | | | |
|---|---|---|---|
| 6,804,824 B1 * | 10/2004 | Potrebic et al. | 725/38 |
| 6,927,806 B2 * | 8/2005 | Chan | 348/731 |
| 6,985,190 B1 | 1/2006 | Klopfenstein et al. | |
| 7,113,230 B1 * | 9/2006 | Genovese et al. | 348/731 |
| 7,546,620 B2 | 6/2009 | Takagi et al. | |
| 7,814,421 B2 * | 10/2010 | Reynolds et al. | 715/716 |
| 2002/0104058 A1 | 8/2002 | Rappaport | |
| 2003/0088870 A1 | 5/2003 | Wang | |
| 2003/0226153 A1 | 12/2003 | Bessel et al. | |
| 2004/0221306 A1 * | 11/2004 | Noh | 725/44 |
| 2005/0144637 A1 | 6/2005 | Shikata et al. | |
| 2005/0170800 A1 | 8/2005 | Taromaru et al. | |
| 2006/0123449 A1 * | 6/2006 | Ma et al. | 725/58 |
| 2006/0161865 A1 * | 7/2006 | Scott et al. | 715/810 |
| 2010/0091191 A1 * | 4/2010 | Bae et al. | 348/564 |
| 2010/0182506 A1 * | 7/2010 | Bae et al. | 348/564 |

FOREIGN PATENT DOCUMENTS

| | | | | |
|---|---|---|---|---|
| EP | 1401198 | | 6/2005 | |
| JP | 10308903 | | 11/1998 | |
| JP | 2001-94892 | | 4/2001 | |
| JP | 2001333336 | | 11/2001 | |
| JP | 2002-232793 | A | 8/2002 | |
| JP | 2002290765 | | 10/2002 | |
| JP | 2002-344337 | A | 11/2002 | |
| JP | 2002344337 | A * | 11/2002 | H04B 1/16 |
| JP | 2003153102 | | 5/2003 | |
| JP | 2004-7318 | | 1/2004 | |
| JP | 2004007318 | A * | 1/2004 | H04N 5/44 |
| JP | 2004180338 | | 6/2004 | |
| JP | 2004-336312 | A | 11/2004 | |
| JP | 2005-217681 | | 8/2005 | |
| KR | 2002-0022667 | | 3/2002 | |
| KR | 10-2005-0077741 | | 8/2005 | |
| WO | WO0145395 | | 6/2001 | |
| WO | WO0201862 | | 1/2002 | |

OTHER PUBLICATIONS

TRIAX ST-HD527 CI 2000, Digital Combo Set-top box, 305013, 24 pgs.

* cited by examiner

METHODS AND APPARATUS FOR PROVIDING A CHANNEL HISTORY

CROSS REFERENCE TO RELATED APPLICATIONS

This application claims the benefit, under 35 U.S.C. §365 of International Application PCT/US2006/031294, filed Aug. 9, 2006, which was published in accordance with PCT Article 21(2) on Mar. 1, 2007 in English and which claims the benefit of U.S. provisional patent application No. 60/710,888 filed on Aug. 24, 2005 and U.S. provisional patent application No. 60/712,463 filed on Aug. 30, 2005.

BACKGROUND OF THE INVENTION

1. Field of the Invention

The present invention generally relates to apparatuses such as mobile television signal receivers having a channel history feature, and more particularly, to methods for adding channels to the channel history, tuning channels from the channel history, and generally maintaining the channel history that are suitable for use with such apparatuses.

2. Background Information

Apparatuses such as mobile television signal receivers often move from one geographical area to another geographical area with their users. As these apparatuses move, they often leave one network or the range of one transmitter and enter another network or the range of another transmitter. As a result of this movement, the available channel line-up may change and some channels may no longer be available. Accordingly, conventional methods of saving the most recently selected channels are not necessarily suitable for such mobile apparatuses.

The present invention described herein provides an apparatus having a channel history, and includes methods for adding channels to the channel history, tuning channels from the channel history, and generally maintaining the channel history that are suitable for mobile apparatuses such as mobile television signal receivers.

SUMMARY OF THE INVENTION

In accordance with an aspect of the present invention, a method for tuning channels is disclosed. According to an exemplary embodiment, the method comprises steps of receiving a useable program signal provided by a first channel; receiving a user input selecting a second channel; testing for presence of a useable program signal provided by said second channel without interrupting said receiving step for receiving a useable program signal provided by said first channel; and if said useable program signal provided by said second channel is detected by said testing step, tuning said second channel.

The method may further includes the step of repeating said testing step for presence of a useable program signal provided by a third channel (530), if said useable program signal provided by said second channel is not detected.

In accordance with another aspect of the present invention, a method for adding a channel to a channel history is disclosed. According to an exemplary embodiment, the method comprises steps of receiving a user input selecting the channel, determining if the channel meets a criterion, and adding the channel to the channel history if the channel meets the criterion.

In accordance with another aspect of the present invention, a method for maintaining a channel history is disclosed. According to an exemplary embodiment, the method comprises steps of (a) retrieving a channel from the channel history, (b) determining whether a useable program signal for the retrieved channel is present, (c) maintaining the retrieved channel in the channel history if the useable program signal is present, (d) updating the channel history by replacing the retrieved channel with another channel if the useable program signal is not present, and if there is a next channel in the channel history, retrieving the next channel and repeating steps (b), (c), and (d).

In accordance with another aspect of the present invention, an apparatus for tuning channels is disclosed. According to an exemplary embodiment, the apparatus comprises first tuning means for tuning a first channel, and means for detecting whether a useable program signal for the first channel is present. Second tuning means tunes the first channel if the useable program signal is present. The first tuning means tunes a second channel to check for a useable program signal if the useable program signal for the first channel is not present.

In accordance with another aspect of the present invention, an apparatus having a channel history is disclosed. According to an exemplary embodiment, the apparatus comprises means for receiving a channel responsive to a user input selecting the channel, and means for determining if the channel meets a criterion and for adding the channel to the channel history if the channel meets the criterion.

In accordance with another aspect of the present invention, an apparatus having a channel history is disclosed. According to an exemplary embodiment, the apparatus comprises means for tuning a channel from the channel history, and means for determining whether a useable program signal for the channel is present. The channel is maintained in the channel history if the useable program signal is present, and the channel history is updated by replacing the channel with another channel if the useable program signal is not present.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
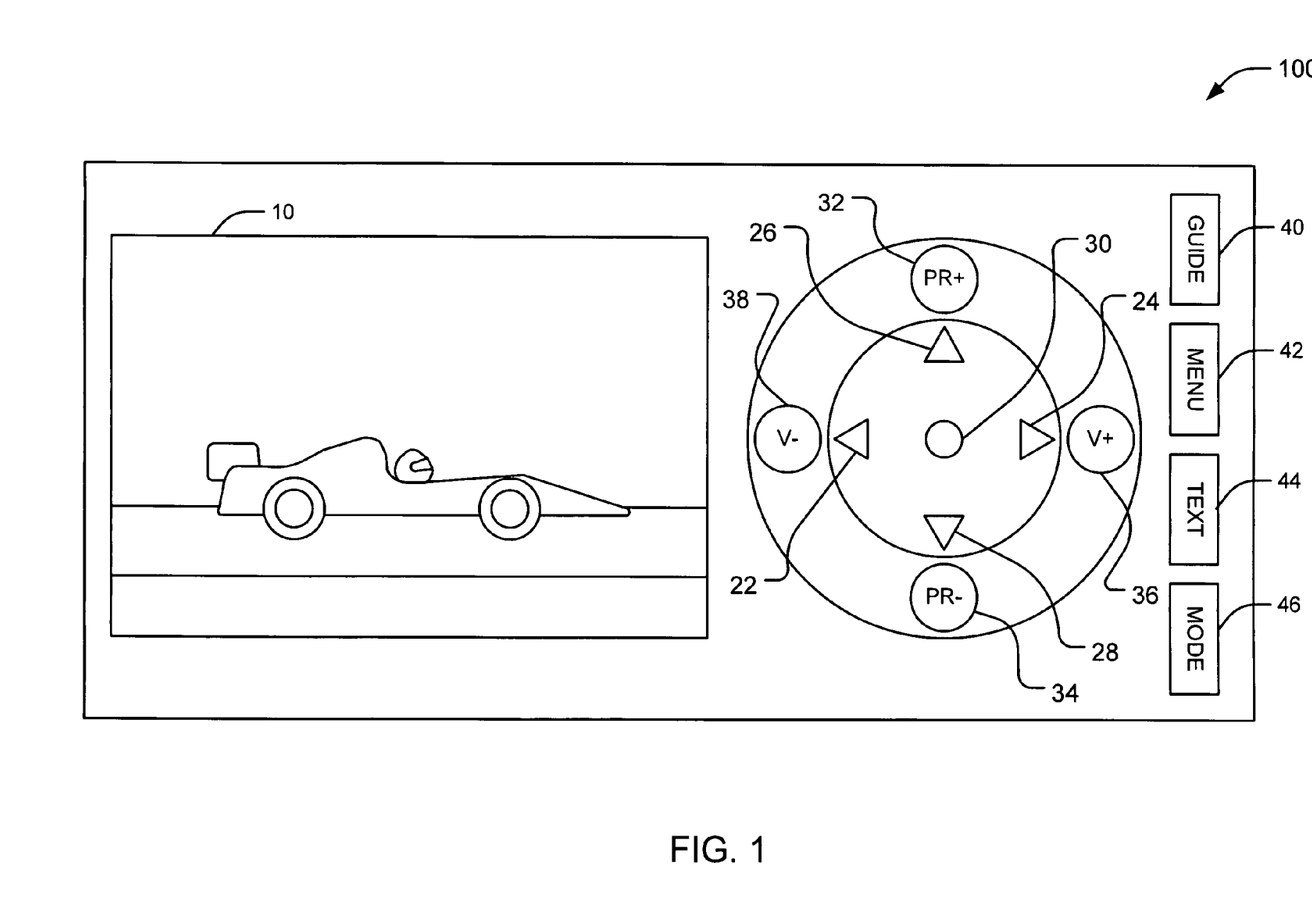
FIG. 1 shows an apparatus according to an exemplary embodiment of the present invention.

Referring now to the drawings, and more particularly to FIG. 1, an apparatus 100 according to an exemplary embodiment of the present invention is shown. According to this exemplary embodiment, apparatus 100 is embodied as a mobile, hand-held television signal receiver, but may also be embodied as another type of apparatus or device capable of providing audio and/or video outputs. Apparatus 100 may also be embodied within, or in conjunction with, another device such as a mobile telephone and/or other device. As indicated in FIG. 1, apparatus 100 comprises a display means such as display 10, and input means including the following keys: LEFT key 22, RIGHT key 24, UP key 26, DOWN key 28, CENTER key 30, PR+ key 32, PR− key 34, V+ key 36, V− key 38, GUIDE key 40, MENU key 42, TEXT key 44, and MODE key 46.

According to an exemplary embodiment, display 10 is embodied as a liquid crystal display (LCD) and provides video and/or still picture outputs. LEFT key 22, RIGHT key 24, UP key 26, and DOWN key 28 are navigation keys that enable a user to navigate within a menu in the left, right, up and down directions, respectively. CENTER key 30 enables a user to execute a highlighted command, bring up contextual information related to a highlighted item, and bring up a full information banner. PR+ key 32 and PR− key 34 enable a user to select the next higher and lower logical channel numbers (LCNs) in an active program guide, respectively. V+ key 36 and V− key 38 enable a user to adjust the volume of audio outputs upwardly and downwardly, respectively. According to an exemplary embodiment, GUIDE key 40, MENU key 42, TEXT key 44, and MODE key 46 may be located on the side of apparatus 100 instead of the front thereof as shown in FIG. 1. GUIDE key 40 enables a user to activate a program guide feature. MENU key 42 enables a user to toggle menus on and off. TEXT key 44 enables a user to send text commands. MODE key 46 enables a user to switch between different operating modes. For example, apparatus 100 includes a color mode in which PR+ key 32, PR− key 34, V+ key 36 and V− key 38 become green, yellow, blue, and red keys, respectively. As will be described later herein, apparatus 100 includes a channel history of previously selected channels and the present invention provides methods for adding channels to the channel history, tuning channels from the channel history, and generally maintaining the channel history.

Figure 2:
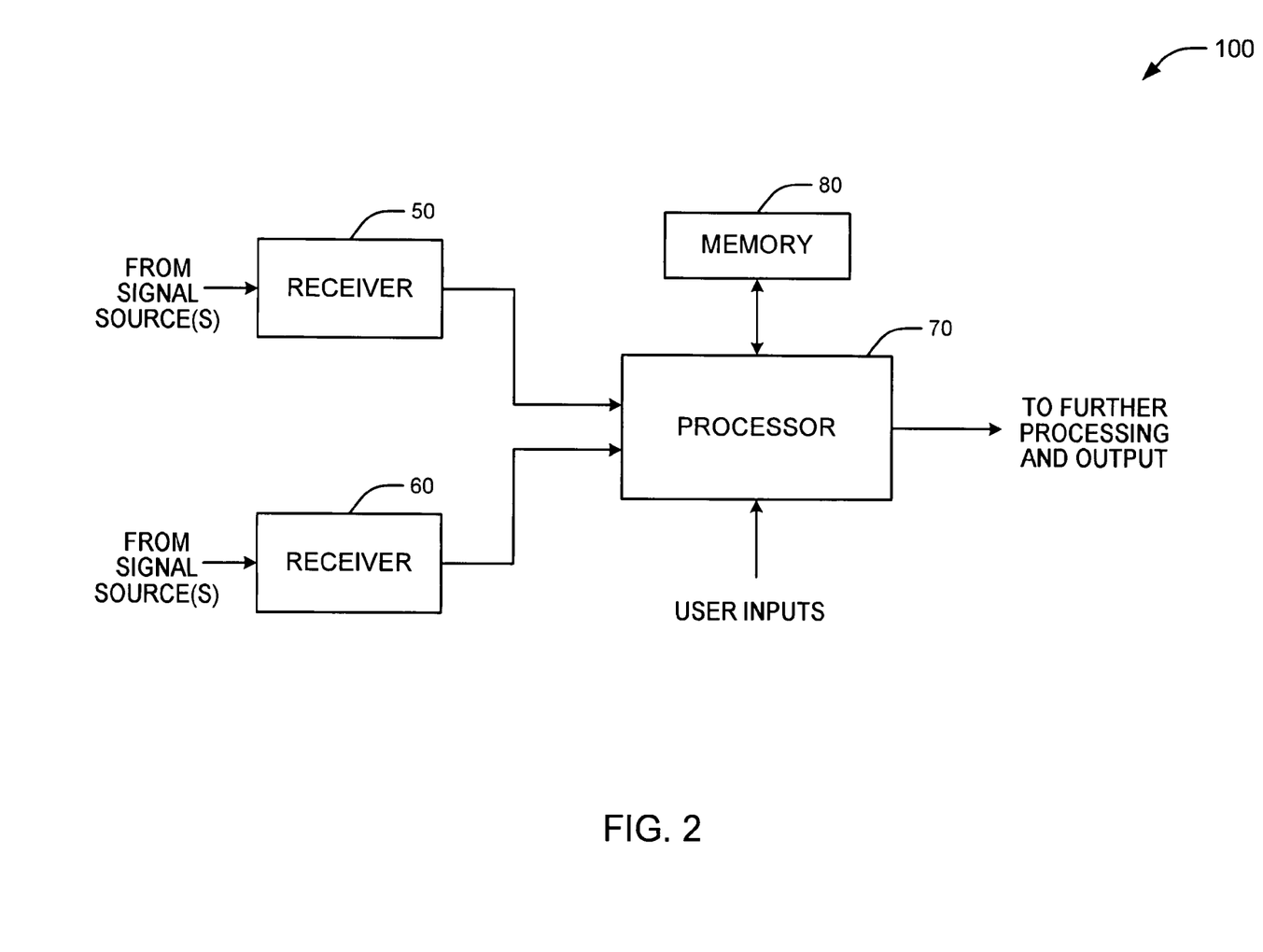
FIG. 2 shows a block diagram of a relevant portion of the apparatus of FIG. 1.

Referring to FIG. 2, a block diagram of a relevant portion of apparatus 100 of FIG. 1 is shown. As indicated in FIG. 2, apparatus 100 comprises first receiving means such as first receiver 50, second receiving means such as second receiver 60, processing means such as processor 70, and memory means such as memory 80. The foregoing elements of apparatus 100 may be implemented using integrated circuits (ICs). For clarity of description, certain conventional elements associated with apparatus 100 including power signals, certain control signals, and audio and video output elements are not shown in FIG. 2.

First receiver 50 is operative to receive and process signals including audio, video and/or data signals provided from one or more signal sources. According to an exemplary embodiment, first receiver 50 performs various functions including tuning, demodulation, forward error correction, and transport processing functions to thereby generate digital data representing audio, video and/or data content. According to this exemplary embodiment, first receiver 50 is used to generate program, signals for purposes of determining whether those program signals are useable by apparatus 100 (e.g., produce a suitable output).

Second receiver 60 is operative to receive and process signals including audio, video and/or data signals provided from one or more signal sources. According to an exemplary embodiment, second receiver 60 also performs various functions including tuning, demodulation, forward error correction, and transport processing functions to thereby generate digital data representing audio, video and/or data content. According to this exemplary embodiment, second receiver 60 is used to generate program signals for user viewing and/or listening after first receiver 50 is used to determine that those channels provide useable program signals. To reduce power consumption, first receiver 50 may be powered on while second receiver 60 is powered off, and vice-versa.

Processor 70 is operative to perform various processing functions including functions related to the channel history of apparatus 100. According to an exemplary embodiment, processor 70 performs functions that enable channels to be added the channel history, enable channels from the channel history to be tuned, and enable the channel history to be maintained. Processor 70 is also operative to receive and process user inputs to apparatus 100, and although not expressly shown in FIG. 2, provides control signals to first receiver 50 and second receiver 60 responsive to user inputs to thereby effectuate channel changing functions thereof. As indicated in FIG. 2, outputs from processor 70 may be provided for further processing and user output. Further details regarding processor 70 will be provided later herein.

The use of first receiver 50 above is only illustrative. First receiver 50 can be used for other purposes as well. For example, first receiver 50 and second receiver 60 can tune the same channel and processor 70 selects signals from the receiver that has a higher signal-to-noise ratio for presenting to a user.

Memory 80 is operative to perform a data storage function of apparatus 100. According to an exemplary embodiment, memory 80 stores data including channel history data. The data may be written to and read from memory 80 under the control of processor 70.

Figure 3:
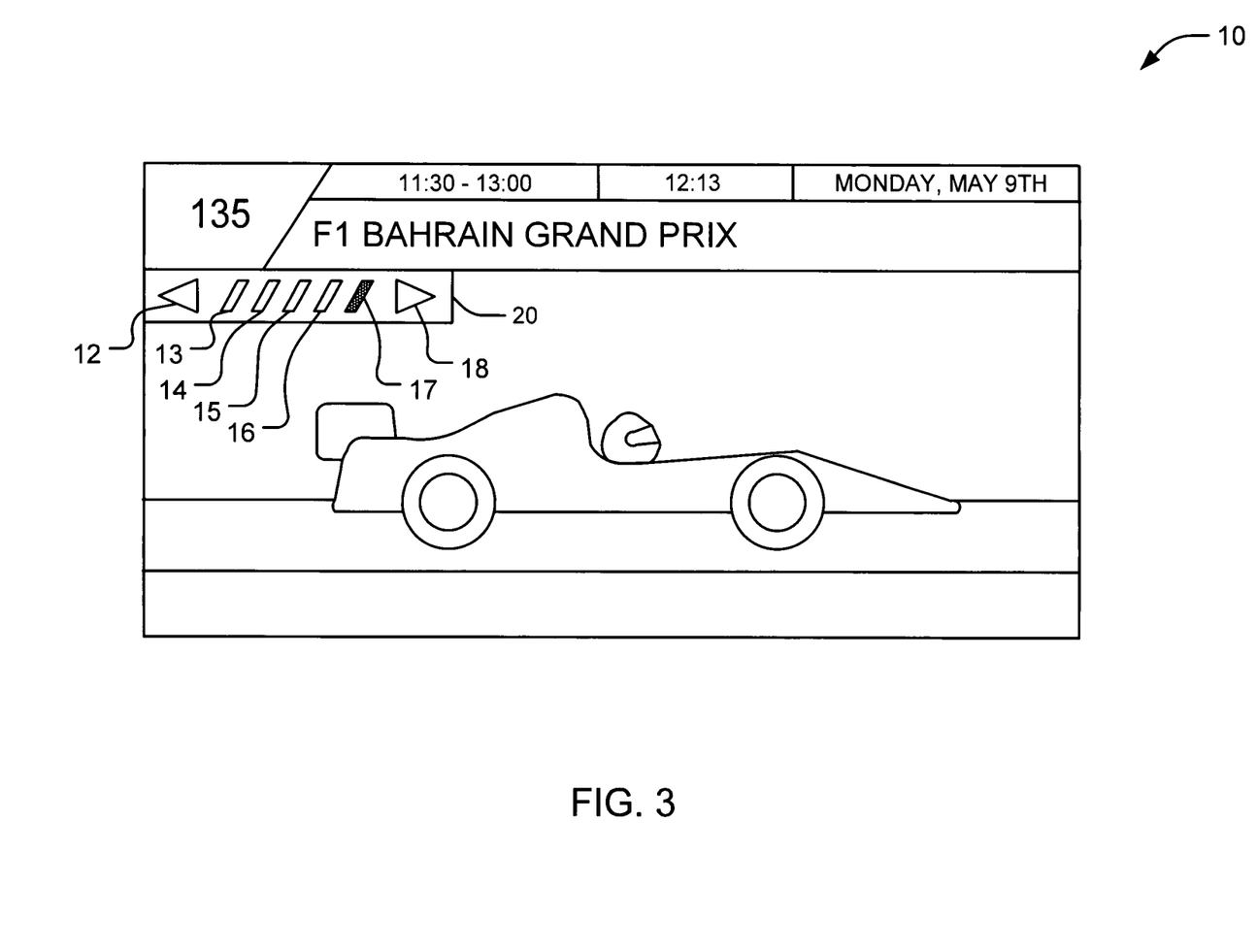
FIG. 3 shows a display including a channel history according to an exemplary embodiment of the present invention.

Referring to FIG. 3, display 10 including a channel history 20 according to an exemplary embodiment of the present invention is shown. According to this exemplary embodiment, a user may cause apparatus 100 to provide display 10 shown in FIG. 3 by providing a predetermined input, such as by pressing CENTER key 30 (see FIG. 1). In FIG. 3, display 10 includes a channel history 20 comprising a left navigation indicator 12, markers 13 to 17 representing previously selected channels, and a right navigation indicator 18. For purposes of example and explanation, FIG. 3 shows five markers 13 to 17. However, a different number of such markers may be included in practice to represent a different number of previously selected channels. Also, the number of channels displayed in channel history 20 may differ from the number of channels saved in memory 80.

According to an exemplary embodiment, markers 13 to 17 are arranged in channel history 20 based on the time in which the channels they represent are selected. More specifically, marker 17 is in a first position and represents the most recently selected channel in channel history 20, marker 16 is in a second position and represents the second most recently selected channel in channel history 20, marker 15 is in a third position and represents the third most recently selected channel in channel history 20, marker 14 is in a fourth position and represents the fourth most recently selected channel in channel history 20, and marker 13 is in a fifth (i.e., last) position and represents the least recently selected channel in channel history 20.

According to an exemplary embodiment, a channel included in channel history 20 may be represented by an LCN, so that similar content, though in a different channel, can be consistently labelled. As each new channel is selected and tuned, channel history 20 is updated as follows: the LCN represented by marker 13 is replaced by the LCN represented by marker 14, the LCN represented by marker 14 is replaced by the LCN represented by marker 15, the LCN represented by marker 15 is replaced by the LCN represented by marker 16, the LCN represented by marker 16 is replaced by the LCN represented by marker 17, and the LCN represented by marker 17 is replaced by the newly tuned LCN which represents the most recently selected channel in channel history 20.

As indicated in FIG. 3, markers 13 to 17 are shown as slash marks wherein one of the slash marks (i.e., marker 17) is highlighted and the remaining slash marks (i.e., markers 13 to 16) are dimmed, or not highlighted. The highlighted slash mark (i.e., marker 17) corresponds to the current LCN shown on display 10. Pressing LEFT key 22 (see FIG. 1) while channel history 20 is displayed causes the channel to change to the next channel on the left within channel history 20, and the highlighted slash mark moves accordingly. In FIG. 3, for example, pressing LEFT key 22 causes the channel to change from the LCN represented by highlighted marker 17 to the LCN represented by marker 16, and also causes marker 16 to become highlighted and marker 17 to dim. Conversely, pressing RIGHT key 24 (see FIG. 1) while channel history 20 is displayed causes the channel to change to the next channel on the right within channel history 20, and the highlighted slash mark moves accordingly. If at the rightmost position within channel history 20 (i.e., marker 17 is highlighted), pressing RIGHT key 24 causes marker 17 to blink without moving it. Conversely, if at the leftmost position within channel history 20 (i.e., marker 13 is highlighted), pressing LEFT key 22 causes marker 13 to blink without moving it. Channel history 20 and other menu information shown in FIG. 3 may be removed from display 10 by the user pressing a predetermined key, such as CENTER key 30 (see FIG. 1), which also causes channel history 20 to be updated.

However, if PR+ key 32 or PR− key 34 is pressed while channel history 20 is displayed, channel history 20 is updated and the rightmost marker (i.e., marker 17) becomes highlighted. If the rightmost marker (i.e., marker 17) is highlighted when PR+ key 32 or PR− key 34 is pressed, this marker remains highlighted but now represents the most recently selected LCN, not the previous LCN. Also, if a selected channel in channel history 20 does not provide a useable program signal (e.g., does not have a signal level higher than a predefined threshold), apparatus 100 may hide, dim (smaller level of brightness) and/or replace the selected channel so that the channel is not selectable by a user. (When a user selects a dim marker, no signal is generated or the selection signal is ignored.) If a channel is not selectable in this manner, apparatus 100 may stay with the currently tuned channel and receives a new selection from a user, or may jump to the next channel in channel history 20 until a channel having a signal level higher than a predefined threshold is identified. In addition to selecting a channel from channel history 20, a user can select a channel by using PR+ key 32 and PR− key 34 or manually enter a channel number using a remote control device (not shown in FIGS.). In any case, during the testing of a useable program signal from a selected channel, the reception of program signals from the currently tuned channel is not interrupted.

Figure 4:
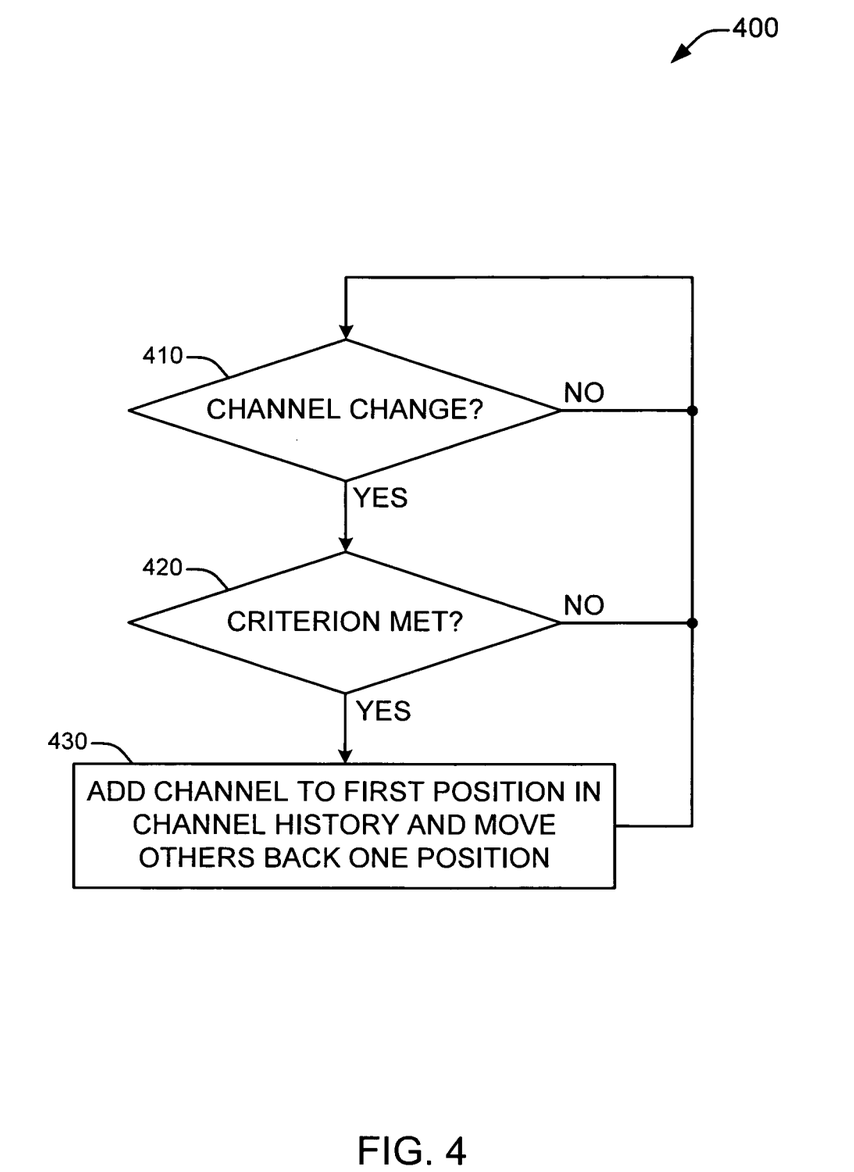
FIG. 4 is a flowchart illustrating steps for adding channels to a channel history according to an exemplary embodiment of the present invention.

Referring to FIG. 4, a flowchart 400 illustrating steps for adding channels to a channel history according to an exemplary embodiment of the present invention is shown. For purposes of example and explanation, the steps of FIG. 4 will be described with reference to apparatus 100 previously described herein. The steps of FIG. 4 are exemplary only, and are not intended to limit the present invention in any manner.

At step 410, apparatus 100 detects whether a channel change has occurred. According to an exemplary embodiment, processor 70 detects at step 410 any user input to apparatus 100 that would cause a channel change to occur. As indicated in FIG. 4, step 410 is repeated until processor 70 detects a channel change.

Once a channel change is detected at step 410, process flow advances to step 420 where apparatus 100 determines whether the channel selected as a result of the channel change meets a criterion. According to an exemplary embodiment, first receiver 50 receives and processes the newly selected channel and processor 70 determines whether the channel meets the criterion at step 420. According to this exemplary embodiment, various different criterions may be used at step 420. For example, a channel may meet the criterion at step 420 if it is a valid channel number and/or has a program signal that is useable (e.g., having a detected signal level greater than a pre-defined threshold). As another example, a channel may meet the criterion at step 420 if the user stays tuned to the channel for a predefined period of time indicating intent to actually view and/or listen to the channel, rather than simply browse. With this latter example, if the channel in question is selected from channel history 20, the user's intent to actually view and/or listen to the channel may for example be presumed if the user provides an input to close the window providing channel history 20. According to other exemplary embodiments, no criterion, a combination of above-mentioned criterions, and/or other criterions may also be used at step 420.

If the determination at step 420 is negative, process flow loops back to step 410 where apparatus 100 continues to detect any channel change. Alternatively, if the determination at step 420 is positive, process flow advances to step 430 where the selected channel is added to the first position of channel history 20 represented by marker 17 and the other channels in channel history 20 (assuming other channels exist) are moved back one marker position (see FIG. 3). If the number of saved channels in channel history 20 has already reached a predefined maximum number, the channel in the last position of channel history 20 represented by marker 13 is dropped from channel history 20 at step 430. Other replacement algorithms can also be used at step 430 to replace channels in channel history 20. For example, the newly added channel may replace the least frequently selected channel in channel history 20, the least recently selected channel in channel history 20, or any channel having a program signal that is not useable (e.g., having a detected signal level less than a pre-defined threshold). According to an exemplary embodiment, channel history 20 may be preloaded with channels during a setup process of apparatus 100 using a channel scan function that selects channels in a sequential manner based on detected signal level.

Figure 5:
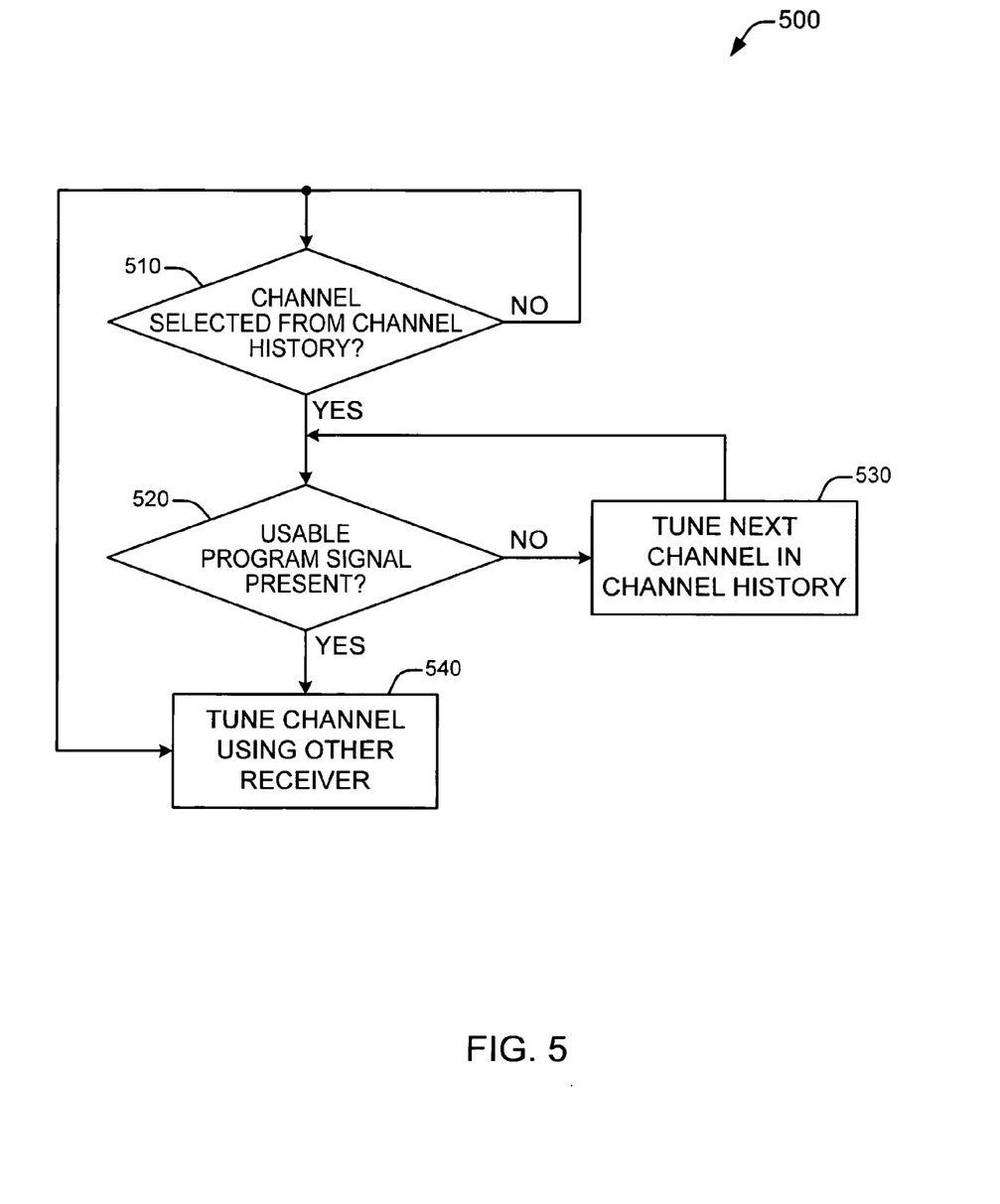
FIG. 5 is a flowchart illustrating steps for tuning channels from a channel history according to an exemplary embodiment of the present invention.

Referring to FIG. 5, a flowchart 500 illustrating steps for tuning channels from a channel history according to an exemplary embodiment of the present invention is shown. For purposes of example and explanation, the steps of FIG. 5 will also be described with reference to apparatus 100 previously described herein. The steps of FIG. 5 are exemplary only, and are not intended to limit the present invention in any manner.

At step 510, apparatus 100 detects whether a channel from channel history 20 has been selected. According to an exemplary embodiment, processor 70 detects any user input to select a channel from channel history 20 while it is displayed (see FIG. 3). As indicated in FIG. 5, step 510 is repeated until processor 70 detects the selection of a channel from channel history 20 by a user. In addition to selecting a channel from channel history 20, a user can select a channel by using PR+ key 32 and PR−key 34 or manually enter a channel number using a remote control device (not shown in FIGS.).

Once a channel selection from channel history 20 (or by other selection methods) is detected at step 510, process flow advances to step 520 where apparatus 100 determines whether the selected channel provides a useable program signal. According to an exemplary embodiment, first receiver 50 receives and processes the newly selected channel and processor 70 determines whether the selected channel provides a useable program signal at step 520. According to this exemplary embodiment, a useable program signal is deemed to be present at step 520 if the selected channel has a signal level higher than a predefined threshold that may be set as a matter of design choice. For example, a channel may be deemed to provide a useable program signal at step 520 if it has a signal level higher than −40 dBm. This threshold may vary depending on the particular signal modulation format. For example, a channel having a 64-QAM modulation format may be deemed to provide a useable program signal at step 520 if it has a signal level higher than −80 dBm. Similarly, a channel having a 16-QAM modulation format may be deemed to provide a useable program signal at step 520 if it has a signal level higher than −85 dBm. Other thresholds may also be used according to the present invention. In this embodiment, receiver 50 tunes the selected channel, which provides a program signal to be tested by processor 70.

If the determination at step 520 is negative, process flow advances to step 530 where apparatus 100 tunes a next channel in channel history 20. According to an exemplary embodiment, processor 70 selects the next channel in channel history 20 and first receiver 50 tunes the newly selected channel at step 530. From step 530, process flow loops back to step 520 where processor 70 determines whether the next channel in channel history 20 provides a useable program signal using the previously described signal level detection technique. As indicated in FIG. 5, steps 520 and 530 are repeatedly performed until a channel in channel history 20 providing a useable program signal (if any) is identified. If there is no channel in channel history 20 that provides a useable program signal, a predetermined message may be displayed to the user via display 10 indicating this fact.

In addition to automatic selection by processor 70 of a next channel, a user may also selects the next channel from channel history 20, by using PR+ key 32 and PR−key 34, or by manually entering a channel number using a remote control device (not shown in FIGS.).

Once the determination at step 520 is positive, process flow advances to step 540 where the channel providing a useable program signal is tuned using the other receiver. According to an exemplary embodiment, this other receiver is second receiver 60 (see FIG. 2). At this point, apparatus 100 receives the useable program signal from receiver 60 and presents the useable program signal to a user. From step 540, process flow loops back to step 510.

Since signals from a selected channel is provided by receiver 50, the tuning and testing of the selected channel do not interrupt the receiving of program signals provided by the currently tuned channel tuned by receiver 60. As such, a user can continue to enjoy programs provided by the currently channel without any interruption if the selected channel does not provide a useable program signal.

Figure 6:
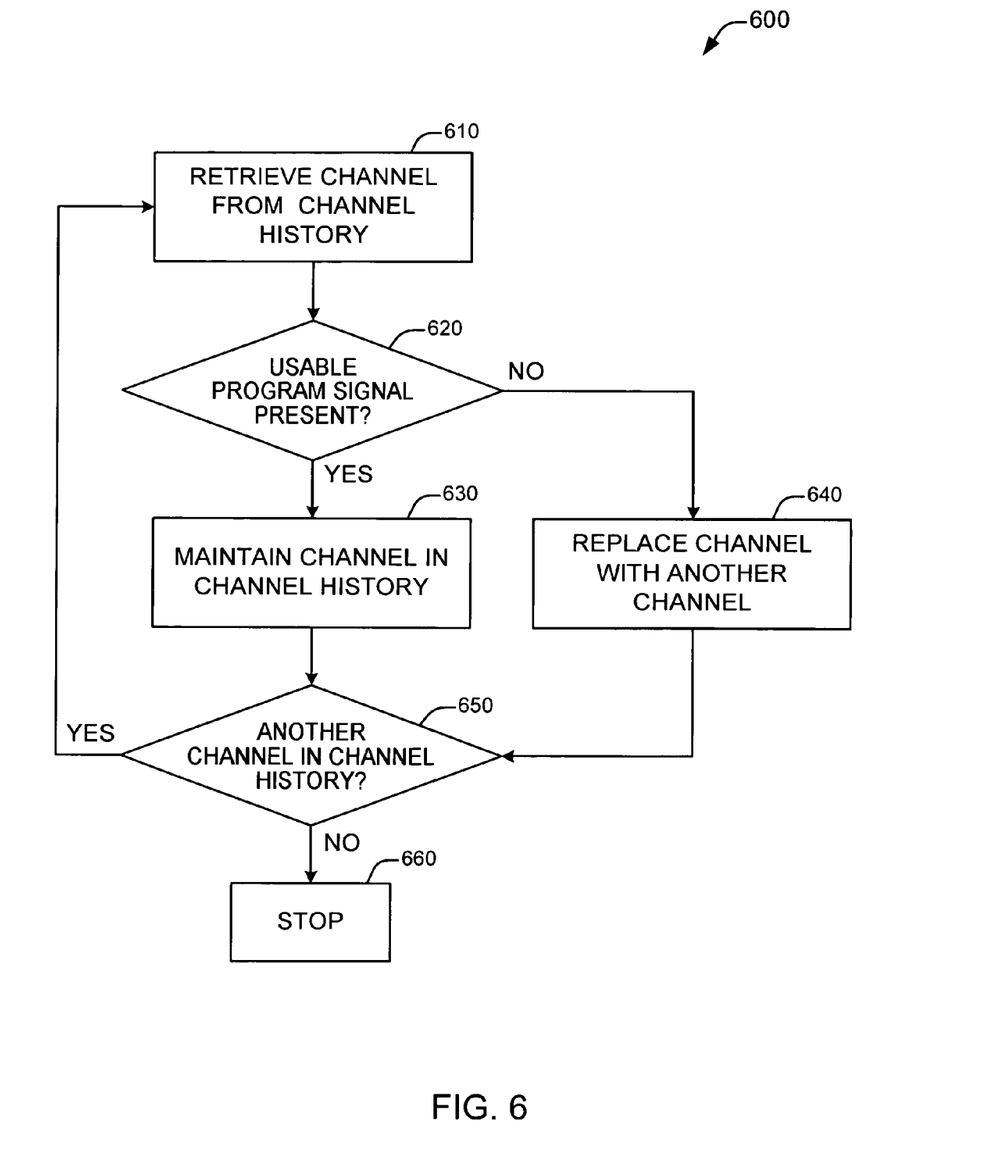
FIG. 6 is a flowchart illustrating steps for maintaining a channel history according to an exemplary embodiment of the present invention.

Referring to FIG. 6, a flowchart 600 illustrating steps for maintaining a channel history according to an exemplary embodiment of the present invention is shown. For purposes of example and explanation, the steps of FIG. 6 will also be described with reference to apparatus 100 previously described herein. The steps of FIG. 6 are exemplary only, and are not intended to limit the present invention in any manner.

At step 610, apparatus 100 retrieves a channel from channel history 20. According to an exemplary embodiment, processor 70 retrieves data corresponding to the channel in channel history 20 from memory 80 and causes first receiver 50 to tune this channel at step 610.

At step 620, apparatus 100 determines whether the retrieved channel from channel history 20 provides a useable program signal. According to an exemplary embodiment, processor 70 determines that a useable program signal is present at step 620 if the retrieved channel has a signal level higher than a predefined threshold that may be set as a matter of design choice. As previously indicated herein, this predefined threshold may for example vary depending on the particular signal modulation format used by the channel.

If the determination at step 620 is positive, process flow advances to step 630 where the retrieved channel is maintained in channel history 20. Alternatively, if the determination at step 620 is negative, process flow advances to step 640 where the retrieved channel is replaced with another channel. A negative determination at step 620 may occur when apparatus 100 has left the transmission range of a given transmitter and moved to another geographical area. According to an exemplary embodiment, processor 70 sequentially saves channel data in memory 80 as channels are tuned and replaces the retrieved channel at step 640 with the next sequential channel. For example, with channel history 20 of FIG. 3 having five channels, if the third channel represented by marker 15 in channel history 20 is replaced at step 640, then the fourth channel represented by marker 14 becomes the third channel, the fifth channel represented by marker 13 becomes the fourth channel, and a next sequential channel saved in memory 80 that was not previously included in channel history 20 (i.e., a sixth channel) becomes the fifth channel represented by marker 13. According to an exemplary embodiment, the process of replacing a channel in channel history 20 at step 640 is transparent to users. That is, the display of channel history 20 as represented to users in FIG. 3 is unaffected upon channel replacement. However, markers 13 to 17 represent different channels than they did before the channel replacement. If a channel is removed from channel history 20 by being replaced at step 640, the user is disallowed from selecting that channel directly from channel history 20 in display 10 (see FIG. 3).

From steps 630 and 640, process flow advances to step 650 where a determination is made as to whether there is another channel included in channel history 20. According to an exemplary embodiment, processor 70 examines channel data stored in memory 80 to make the determination at step 650. If the determination at step 650 is negative, process flow advances to step 660 where the process stops. Alternatively, if the determination at step 650 is positive, process flow loops back to step 610 where another channel from channel history is retrieved and the above-described steps are repeated.

When performing the steps of FIG. 6, the LCN may serve as a basis for determining if a channel provided from a new transmitter is the same channel provided from another transmitter. However, apparatus 100 could be more discriminating and use an identification code for the LCN that determines if one LCN has the same programming as the same LCN on a different transmitter. In general, an LCN carries mostly the same programming, but there can be regional differences. The identification code being identical ensures all content is the same. Moreover, a channel could be maintained in channel history 20 such that even if a channel were replaced and dropped from the user selectable channel history 20, it may be retained in memory 80 so that if apparatus 100 comes back into a previous transmission range, the channel could once again become selectable from channel history 20.

As described herein, the present invention provides an apparatus and methods for adding channels to a channel history, tuning channels from the channel history, and generally maintaining the channel history. The present invention may be applicable to various apparatuses, either with or without an integrated display device. Accordingly, the phrase "television signal receiver" as used herein may refer to systems or apparatuses including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method, comprising steps of:
providing, via an apparatus, a display including a main video portion and a channel history portion, said channel history portion being displayed simultaneously with said main video portion and representing a channel history of said apparatus, said channel history portion comprising a plurality of contiguously arranged and identically shaped marks representing a list of channels previously selected by a user of said apparatus ranging from a first channel representing a most recently selected channel in said channel history to a final channel representing a least recently selected channel in said channel history, said channel history portion further comprising a plurality of navigation elements that enable said user to navigate between said marks representing said channels of said channel history and thereby change a video output of said main video portion; and
highlighting, via said apparatus, one of said marks from said channel history portion corresponding to one of said channels from said channel history that is currently shown in said main display portion, and wherein said highlighting moves between said marks in response to said user manipulating said navigation elements and thereby changes said video output of said main video portion; wherein said apparatus comprises first and second tuning means and the method further comprises:
testing, via said first tuning means, for presence of a useable program signal provided by said first channel in response to a user input;
if said useable program signal provided by said first channel is detected by said testing step, tuning and providing an output of said first channel via said second tuning means;
if said useable program signal provided by said first channel is not detected by said testing step, testing, via said first tuning means, for presence of a useable program signal provided by a second channel from said channel history representing a second most recently selected channel in said channel history;
if said useable program signal provided by said second channel is detected by said testing step, tuning and providing an output of said second channel via said second tuning means;
if said useable program signal provided by said second channel is not detected by said testing step, continuing to test, via said first tuning means, for a useable program signal on each successive channel in said channel history in a sequential manner up to said final channel until any said useable program signal is detected; and
powering on said first tuning means while said second tuning means is powered off.

2. The method of claim 1, further comprising a step of:
providing an output, via said second tuning means, of one of said successive channels in said channel history in response to detecting said useable program signal on said one of said successive channels.

3. The method of claim 2, further comprising a step of receiving said user input selecting said first channel including receiving user input selection of one of said displayed marks corresponding to said first channel.

4. The method of claim 1, further comprising the step of storing a set of channels representing said channel history.

5. The method of claim 4, further comprising the step of replacing, via said apparatus, one of said channels from said channel history such that said display of said channel history portion is unchanged to said user after said replacement.

6. The method of claim 4, further comprising the step of arranging said displayed marks according to a selection order of said stored channels in said channel history.

7. The method of claim 4, further comprising the step of not displaying a mark representing a given stored channel, if a useable program signal provided by said given stored channel is not detected.

8. The method of claim 4, further comprising the step of displaying a mark representing a given stored channel in a different level of brightness than other marks, if a useable program signal provided by said given stored channel is not detected.

9. The method of claim 4, further comprising the step of removing a mark displayed in said displaying step and representing a given stored channel, if a useable program signal provided by said given stored channel is not detected.

10. An apparatus, comprising:
means for providing a display including a main video portion and a channel history portion, said channel history portion being displayed simultaneously with said main video portion and representing a channel history of said apparatus, said channel history portion comprising a plurality of contiguously arranged and identically shaped marks representing a list of channels previously selected by a user ranging from a first channel representing a most recently selected channel in said channel history to a final channel representing a least recently selected channel in said channel history, said channel history portion further comprising a plurality of navigation elements that enable said user to navigate between said marks representing said channels of said channel history and thereby change a video output of said main video portion;
means for highlighting one of said marks from said channel history portion corresponding to one of said channels from said channel history that is currently shown in said main display portion, and wherein said highlighting moves between said marks in response to said user manipulating said navigation elements and thereby changes said video output of said main video portion;

first tuning means for testing for presence of a useable program signal provided by said first channel in response to a user input; and second tuning means for tuning and providing an output of said first channel if said useable program signal provided by said first channel is detected by said testing; and wherein:

if said useable program signal provided by said first channel is not detected by said testing, said first tuning means tests for presence of a useable program signal provided by a second channel from said channel history representing a second most recently selected channel in said channel history;

if said useable program signal provided by said second channel is detected by said testing, said second tuning means tunes and provides an output of said second channel;

if said useable program signal provided by said second channel is not detected by said testing, said first tuning means continues to test for a useable program signal on each successive channel in said channel history in a sequential manner UP to said final channel until any said useable program signal is detected; and if said useable program signal provided by said second channel is not detected by said testing, said first tuning means continues to test for a useable program signal on each successive channel in said channel history in a sequential manner UP to said final channel until any said useable program signal is detected; and said first tuning means is powered on while said second tuning means is powered off.

11. The apparatus of claim 10, wherein said first tuning means is powered off while said second tuning means is powered on.

12. The apparatus of claim 10, wherein said displayed channel history includes a pre-defined number of channels.

13. The apparatus of claim 10, wherein said apparatus is operative to replace one of said channels from said channel history such that said display of said channel history portion is unchanged to said user after said replacement.

14. The apparatus of claim 13, wherein said marks are arranged in said channel history according to a time most recently selected.

15. The apparatus of claim 14, wherein said marks are arranged in said channel history such that said mark for a channel most recently selected is in a first position and said mark for a channel least recently selected is in a last position.

16. The apparatus of claim 13, wherein said user selects one of said previously selected channels in said channel history by selecting one of said marks.

17. The apparatus of claim 16, wherein said user is disallowed from selecting a given one of said previously selected channels from said channel history if a useable program signal for said given channel is not present.

18. The apparatus of claim 17, wherein said user is disallowed from selecting said given channel from said channel history by causing said mark for said given channel to correspond to another channel.

19. The apparatus of claim 17, wherein said channel history is updated if a useable program signal for said given channel is not present.

* * * * *